United States Patent [19]

Fisch

[11] 4,412,977

[45] Nov. 1, 1983

[54] SELECTIVE ACID GAS REMOVAL

[75] Inventor: Edwin J. Fisch, Houston, Tex.

[73] Assignee: Shell Oil Company, Houston, Tex.

[21] Appl. No.: 369,454

[22] Filed: Apr. 19, 1982

[51] Int. Cl.$^3$ .............................................. B01D 53/34
[52] U.S. Cl. .................................... 423/226; 423/228; 423/243; 423/416
[58] Field of Search ................ 423/226, 228, 243, 416

[56] References Cited

U.S. PATENT DOCUMENTS 3,965,244 6/1976 Sykes, Jr. ............................ 423/228
3,989,811 11/1976 Hill .................................. 423/573 G
4,368,059 1/1983 Doerges et al. ................. 423/228 X

*Primary Examiner*—Earl C. Thomas

[57] ABSTRACT

An integrated process to selectively remove and separate $H_2S$, $CO_2$ and COS from a feed gas stream is disclosed. The process involves three separate absorption/regeneration steps. In the first step the feed gas is contacted with an absorbent solution to selectivity remove $CO_2$ and $H_2S$ but not COS. The COS-rich stream is then contacted in another stage to selectively remove the COS. After stripping the $CO_2$ and $H_2S$ gaseous stream from the first stage, the acid gas stream is contacted with a separate absorption stream to selectively remove the $H_2S$. As a result four separate gaseous streams are produced—a purified acid gas-free stream, a COS stream, an $H_2S$ stream and a $CO_2$ stream.

3 Claims, 1 Drawing Figure

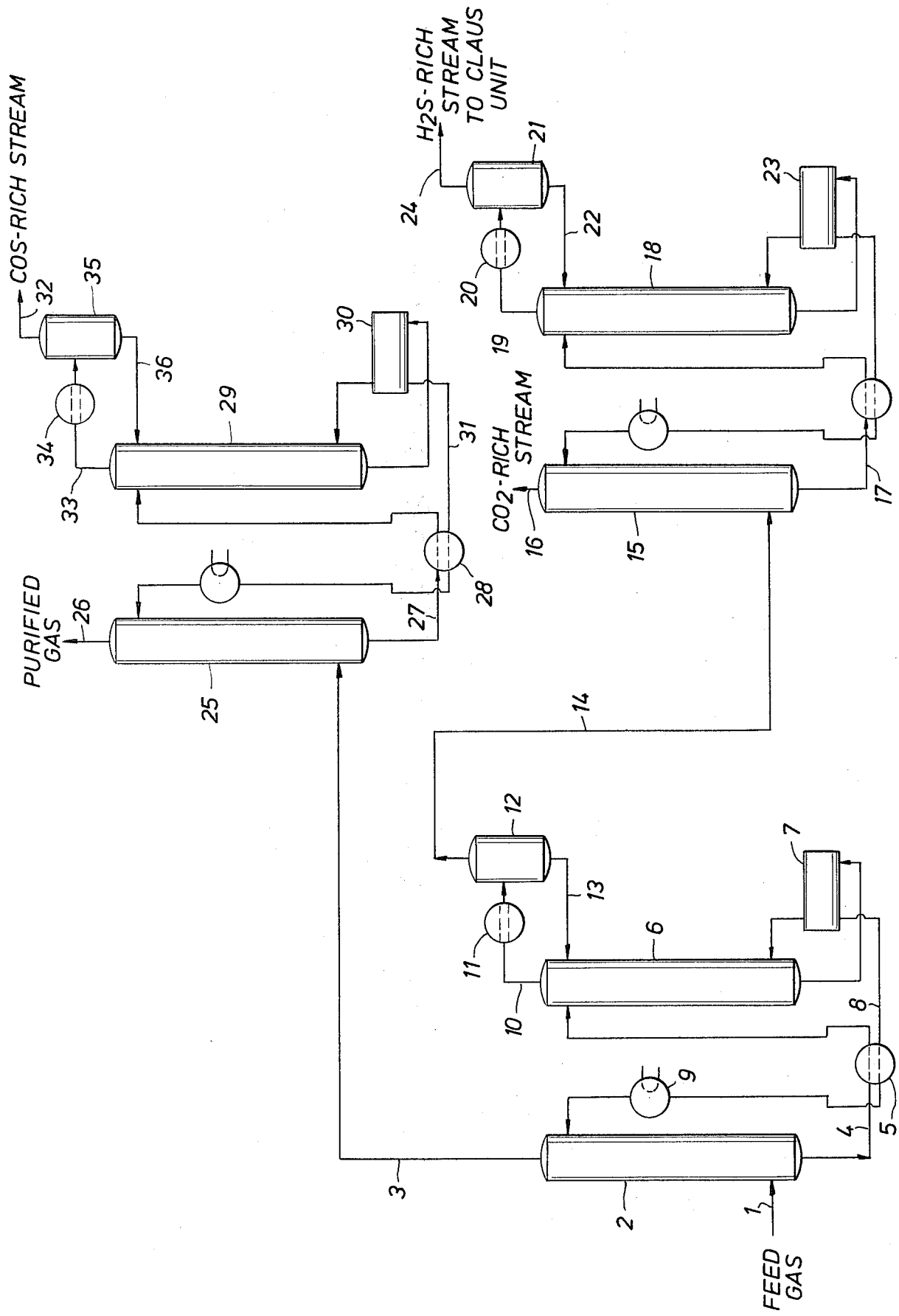

SELECTIVE ACID GAS REMOVAL

BACKGROUND OF THE INVENTION

1. Field of the Invention

This invention is directed to a process for the selective removal of acidic compounds ($CO_2$, $H_2S$ and COS) from gaseous feed streams.

2. Description of the Prior Art

For a variety of industrial applications, it is necessary or desirable to reduce the sulfur content of a gaseous mixture containing significant quantities of COS in addition to $H_2S$ and $CO_2$ to low levels prior to further processing and/or utilization of the gaseous mixture. For example, sour gas available from certain natural gas reservoirs is known to contain up to about 0.1% by volume (1000 ppm) COS in addition to substantial quantities of $H_2S$ and $CO_2$. Since the COS present in the sour gas makes up part of the total sulfur, substantial removal of same, in addition to the $H_2S$ present, is necessary to meet many of the specifications for conventional end uses of such gas, e.g., residential heating and industrial uses. Further, in conventional partial combustion processes utilizing sour liquid hydrocarbon oils or sulfur-containing coals as the primary fuel source, a crude synthesis gas product is obtained which typically contains 100 to 500 ppm COS in addition to the $H_2S$ and $CO_2$ partial combustion by-products. In many cases this crude synthesis gas product is subject to further processing, e.g., contact with sulfur-sensitive CO-shift catalysts in hydrogen manufacture, or funneled to industrial and consumer end uses, e.g., as energy source in gas turbine generation of electricity or as a town gas for private consumption, which makes it desirable or even essential that the total sulfur content of the combustion gas be reduced to very low levels.

A further problem in removing acid gases is that any $CO_2$ and COS removed with the $H_2S$ must be contended with in further treatment steps. Although the $CO_2$ can be vented, if separated from the $H_2S$, the COS cannot because of its poisonous character. On the other hand, the desorption characteristics of COS are similar to those of $CO_2$, so that separation techniques are complicated. Finally, the diluting effect of large amounts of $CO_2$ renders the practice of the "Claus Process" (in which $H_2S$ is reduced to elemental sulfur) impractical or impossible. Aside from other considerations, capital costs necessary for streams containing large volumes of $CO_2$, etc., would be prohibitive. Accordingly, there exists a genuine need for an economical method for removal of $H_2S$, and $CO_2$ and COS (so-called acid gases) from desired gaseous streams which avoids these problems and disadvantages.

U.S. Pat. No. 3,965,244 and U.S. Pat. No. 3,989,811 describe processes for the removal of $H_2S$, $CO_2$ and COS. U.S. Pat. No. 3,965,244 provides for sufficient contacting of the gaseous stream with an aqueous polyalkanolamine solution containing sulfolane to ensure hydrolyzing of a substantial portion of the COS present in the feed gas stream. The stripped gas is then contacted with an alkanolamine absorbent solution in a second stage to produce a substantially $H_2S$-free, $CO_2$-containing gas stream. U.S. Pat. No. 3,989,811 likewise relies upon the hydrolyzing of COS in the first stage prior to selective absorption in a second stage. Both of the above processes are less than ideal in that relatively larger equipment is required. This is so since in order to assure substantial removal of COS, treating conditions must be of sufficient severity (relatively high temperature and long residence time) to achieve substantial hydrolysis of COS to form $H_2S$ and $CO_2$. Accordingly, what is needed in actual practice is an improved process that permits the separation of feed gas streams into separate streams that can be either vented or processed further to eliminate pollution problems.

SUMMARY OF THE INVENTION

The present invention provides for a process to selectively remove $CO_2$, $H_2S$ and COS from a feed gas stream. By employing the present invention it is possible to obtain separate COS, $CO_2$ and $H_2S$ streams which may be vented (in the case of $CO_2$) or further processed (in the case of COS and $H_2S$). Specifically, the present invention is a process for the selective removal of acidic compounds from a feed gas stream containing $CO_2$, $H_2S$ and COS which comprises:

(a) contacting said feed gas stream in a first stage at a temperature of from 32° C. to 57° C. and a pressure of from 23 atmospheres to 82 atmospheres with a first aqueous absorbent solution, said solution containing between 30 and 50 percent by weight water, between 30 and 60 percent by weight of a secondary or tertiary alkanolamine and between 10 and 40 percent by weight of a tetramethylene sulfone, thereby producing (i) a gaseous COS-rich stream containing greater than about 80 percent by volume of the COS in said feed gas stream, and (ii) an acid gas-loaded first absorbent stream, the ratio of said first aqueous absorbent solution to said feed gas stream being such that the amount of $H_2S$ plus $CO_2$ in said acid gas-loaded first absorbent stream is 85% or more of equilibrium;

(b) stripping said acid gas-loaded first absorbent stream and producing an acid gas stream containing principally $H_2S$ and $CO_2$;

(c) selectively absorbing $H_2S$ from said acid gas stream in a second stage with a second absorbent solution containing water and a secondary or tertiary alkanolamine to produce (i) a stream containing predominately $CO_2$ and (ii) an $H_2S$-rich absorbent stream;

(d) regenerating said $H_2S$-rich absorbent stream to produce a stream containing predominately $H_2S$;

(e) contacting said gaseous COS-rich stream from step (a) with a third absorbent solution containing between 10 and 15 percent by weight water, between 30 and 45 percent by weight diisopropanolamine and between 40 and 60 percent by weight of a tetramethylene sulfone in a third stage to produce (i) an acid gas-free stream and (ii) a COS-rich absorbent stream; and (f) regenerating said COS-rich absorbent stream to produce a stream containing predominately COS.

A key aspect of the present invention is the selective absorption of the first stage. In the first stage it is desired to selectively absorb the $H_2S$ and $CO_2$ and not the COS. Part of this invention involves the discovery that absorption with the solvent of the present invention can be controlled to reduce the COS absorption rate. It has been found that COS absorption is adversely affected by high water content of the solvent, by high temperature of the solvent, by low system pressure, by a low number of theoretical stages, by high $CO_2$ content of the solvent, and/or by high velocity (above a certain level) of the gas based on the active area of the contactor trays (i.e. vapor/liquid contact time per actual tray). Practice of the invention, therefore, should permit attaining in the first contacting zone an economically advantageous increase in $H_2S$ and $CO_2$ loading of the solvent above that which could be tolerated if COS must be simultaneously removed; this feature would at least partly off-set the solvent circulation requirement to the second contacting zone.

DETAILED DESCRIPTION OF THE DRAWING

In order to describe the invention in greater detail, reference is made to the accompanying drawing, which is a schematic representation of one embodiment according to the process of the invention. The values given herein relating to temperatures, pressures, compositions, etc., should be considered merely exemplary and not as limiting the invention. The example herein is based on hypothetical considerations.

A sour feed gas containing $H_2S$, $CO_2$ and COS in line 1 enters the first stage absorption column 2. The gas is contacted in a counter current fashion with an absorbent composed of about 10 percent by weight sulfolane, 40 percent by weight water and 50 percent by weight diisopropanolamine. The pressure of the feed gas is about 500 psig and the temperature of the lean absorbent is about 49° C. A relatively low contact time is employed. By controlling the pressure, lean solvent temperature, velocity of the gas, etc., it is possible to remove the $CO_2$ and $H_2S$ to the desired levels without removing or hydrolyzing substantial portions of the COS. The $CO_2$ and $H_2S$ are absorbed quickly, and the overhead gas stream containing a majority of the COS and little of the $H_2S$ or $CO_2$ exits column 2 via line 3. Loaded or rich absorbent, i.e. absorbent containing the absorbed $H_2S$ and $CO_2$, is passed through line 4 through heat exchanger 5 where heat is imparted to the stream. The stream is then regenerated in stripping column 6 to free the $H_2S$ and $CO_2$ from the absorbent, and additional heat is provided by reboiler 7. Other types of regenerating units may be used. The temperature in the bottom of stripping column 6 is about 118° C., while the temperature at the top of the column will be about 88° C. Pressure is maintained in the stripping column at about 10 p.s.i.g. As will be apparent to those skilled in the art, temperatures and pressures may be adjusted to provide the appropriate concentration of $H_2S$ and $CO_2$ in the lean absorbent returned to column 2 to provide the degree of stripping desired.

The stripped or "lean" absorbent is returned, preferably, through line 8, through heat exchanger 5 and cooler 9 to absorption column 2. From regeneration column 6, the liberated acid gases, i.e., $H_2S$ and $CO_2$ are passed through line 10 through cooler 11. Condenser 12 provides for collection of carryover absorbent (including water), and is normally operated at 38° C. to 52° C. Condensed absorbent and water are returned via line 13 to regeneration column 6.

At this point, the gas stream leaving condenser 12 is composed almost exclusively of $CO_2$ and $H_2S$ saturated with water vapor. This stream cannot be processed in a Claus plant, as indicated earlier, since the ratio of $H_2S$ to $CO_2$ would be too low. The invention, therefore, provides for the removal of the bulk of the $CO_2$ from the stream, thus increasing the ratio of $H_2S$ to $CO_2$.

Accordingly, the $CO_2/H_2S$ stream is passed through line 14 to absorption column 15. Absorption column 15 is operated in a manner which will reject the $CO_2$, but absorb $H_2S$. For example, a liquid absorbent containing about 30 percent methyldiethanolamine and about 70 percent water is used. The temperature of the lean absorbent is about 38° C. and a pressure of about 6 p.s.i.g. is maintained. The trays have an average dry tray pressure drop of 2 to 4 inches of liquid, and velocity of the stream is about 2 meters per second. $CO_2$ is vented continuously through line 16, while the $H_2S$-rich absorbent is passed continuously through line 17 to regeneration column 18.

Desorption column 18 is operated much in the fashion of column 6, except that the $CO_2$ and $H_2S$ contents are regulated to return the desired lean mixture back to column 15. The liberated gas stream now containing 15 percent to 70 percent by volume $H_2S$ (preferably 45 percent through 70 percent), the balance being $CO_2$, is passed through line 19 through heat exchanger 20 and condenser 21. In condenser 21, carryover absorbent is collected and returned via line 22 to column 18. Lean solvent is returned to column 15 via reboiler 23. $H_2S$ from condenser is passed to a Claus unit via line 24 for conversion to elemental sulfur. Off-gases from the Claus units may be processed according to techniques known to those skilled in the art.

The overhead stream 3 from column 2 is routed to a third absorption column 25. The gas is contacted in a counter current fashion with an absorbent composed of about 45 percent by weight diisopropanolamine, about 40 percent by weight sulfolane and about 15 percent by weight water. The pressure in absorption column 25 is about 490 p.s.i.g. The temperature of the lean absorbent is about 38° C. and the contact time is relatively long. The purified gas containing less than 10 ppm COS, exits via line 26. Rich absorbent containing the absorbed COS is passed through line 27 through heat exchanger 28 where heat is imparted to the stream. The stream is then regenerated in stripping column 29 to free the COS and any CO-absorbed $H_2S$ and $CO_2$ from the absorbent and additional heat is provided by reboiler 30. The lean absorbent is returned through line 31 and the liberated COS plus $H_2S$ and $CO_2$ is routed to the sulfur recovery unit through line 32. As with the other two desorbers, the liberated gas stream, a COS-rich stream, is passed through line 33 through heat exchanger 34 and condenser 35. In condenser 35, carryover absorbent is collected and returned via line 36 to column 29.

While the invention has been illustrated with respect to the particular apparatus, those skilled in the art will recognize that other equivalent or analogous units may be employed. Again, all pumps, valves, etc. have not been illustrated, as such expedients can readily be supplied by those familiar with the art.

What is claimed is:

1. A process for the selective removal of acidic compounds from a feed gas stream containing $CO_2$, $H_2S$ and COS which comprises:
   (a) contacting said feed gas stream in a first stage at a temperature of from 32° C. to 57° C. and a pressure of from 23 atmospheres to 82 atmospheres with a first aqueous absorbent solution, said solution containing between 30 and 50 percent by weight water, between 30 and 60 percent by weight of a secondary or tertiary alkanolamine and between 10 and 40 percent by weight of a tetramethylene sulfone, thereby producing (i) a gaseous COS-rich stream containing greater than about 80 percent by volume of the COS in said feed gas stream, and (ii) an acid gas-loaded first absorbent stream, the ratio of said first aqueous absorbent solution to said feed gas stream being such that the amount of $H_2S$ plus $CO_2$ in said acid gas-loaded first absorbent stream is 85% or more of equilibrium;

(b) stripping said acid gas-loaded first absorbent stream and producing an acid gas stream containing principally H$_2$S and CO$_2$;

(c) selectively absorbing H$_2$S from said acid gas stream in a second stage with a second absorbent solution containing water and a secondary or tertiary alkanolamine to produce (i) a stream containing predominately CO$_2$ and (ii) an H$_2$S-rich absorbent stream;

(d) regenerating said H$_2$S-rich absorbent stream to produce a stream containing predominately H$_2$S;

(e) contacting said gaseous COS-rich stream from step (a) with a third absorbent solution containing between 10 and 15 percent by weight water, between 30 and 45 percent by weight diisopropanolamine and between 40 and 60 percent by weight of a tetramethylene sulfolane in a third stage to produce (i) an acid gas-free stream and (ii) a COS-rich absorbent stream; and (f) regenerating said COS-rich absorbent stream to produce a stream containing predominately COS.

2. The process according to claim 1 wherein the alkanolamine employed in said first absorbent solution is diisopropanolamine and said tetramethylene sulfone is sulfolane.

3. The process according to claim 1 or 2 wherein the alkanolamine employed in said second absorbent solution is methyldiethanolamine.

* * * * *